UNITED STATES PATENT OFFICE.

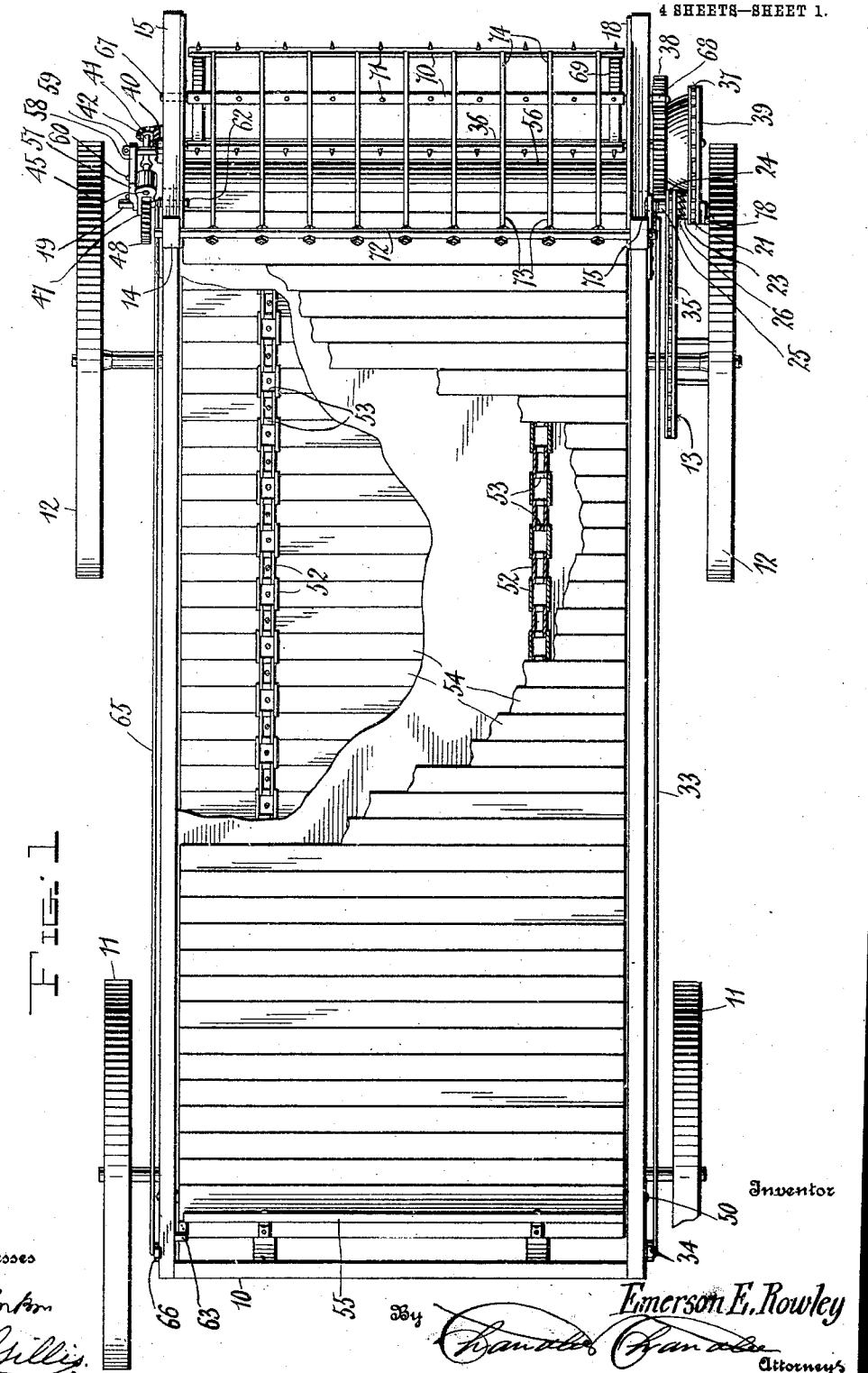

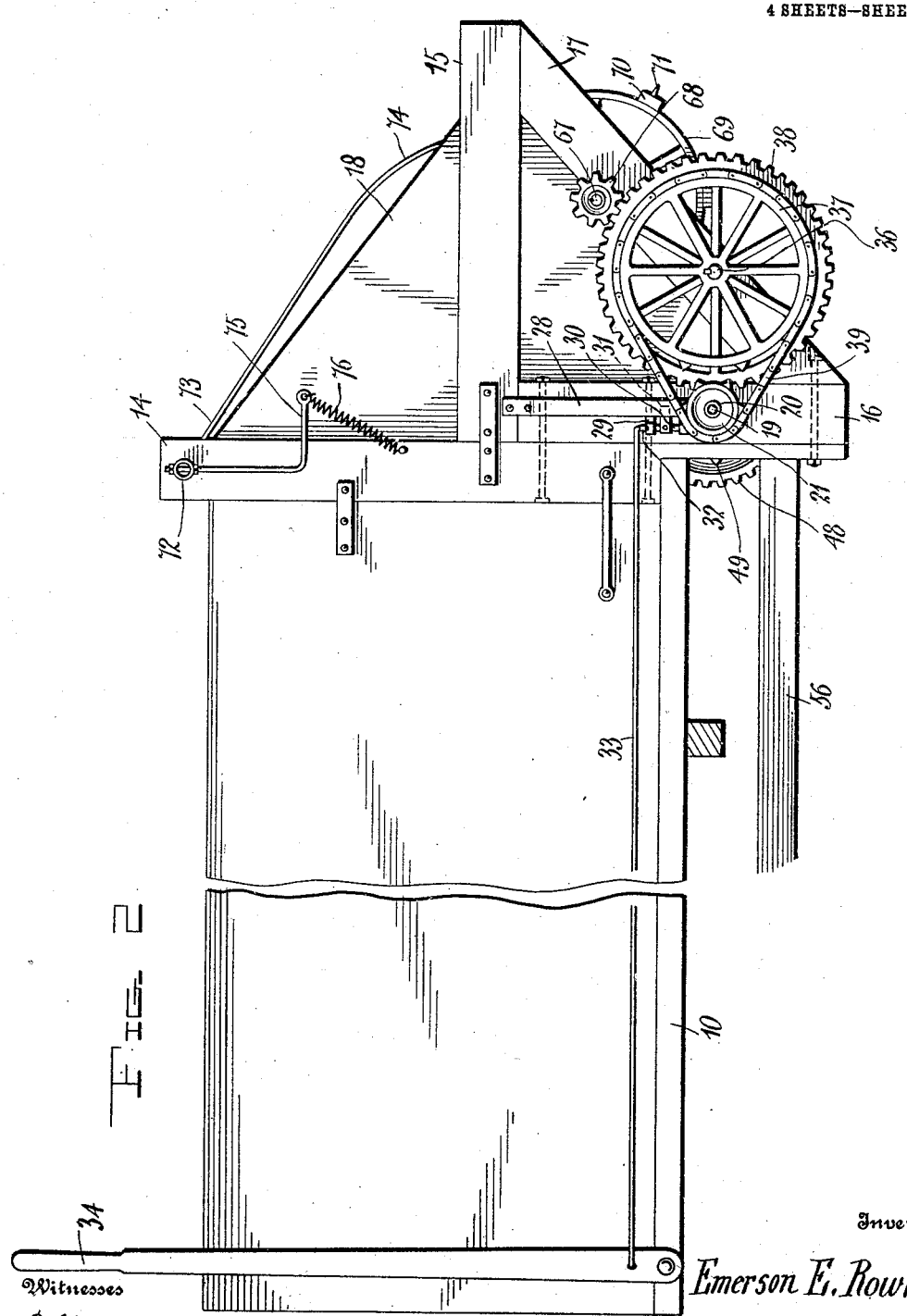

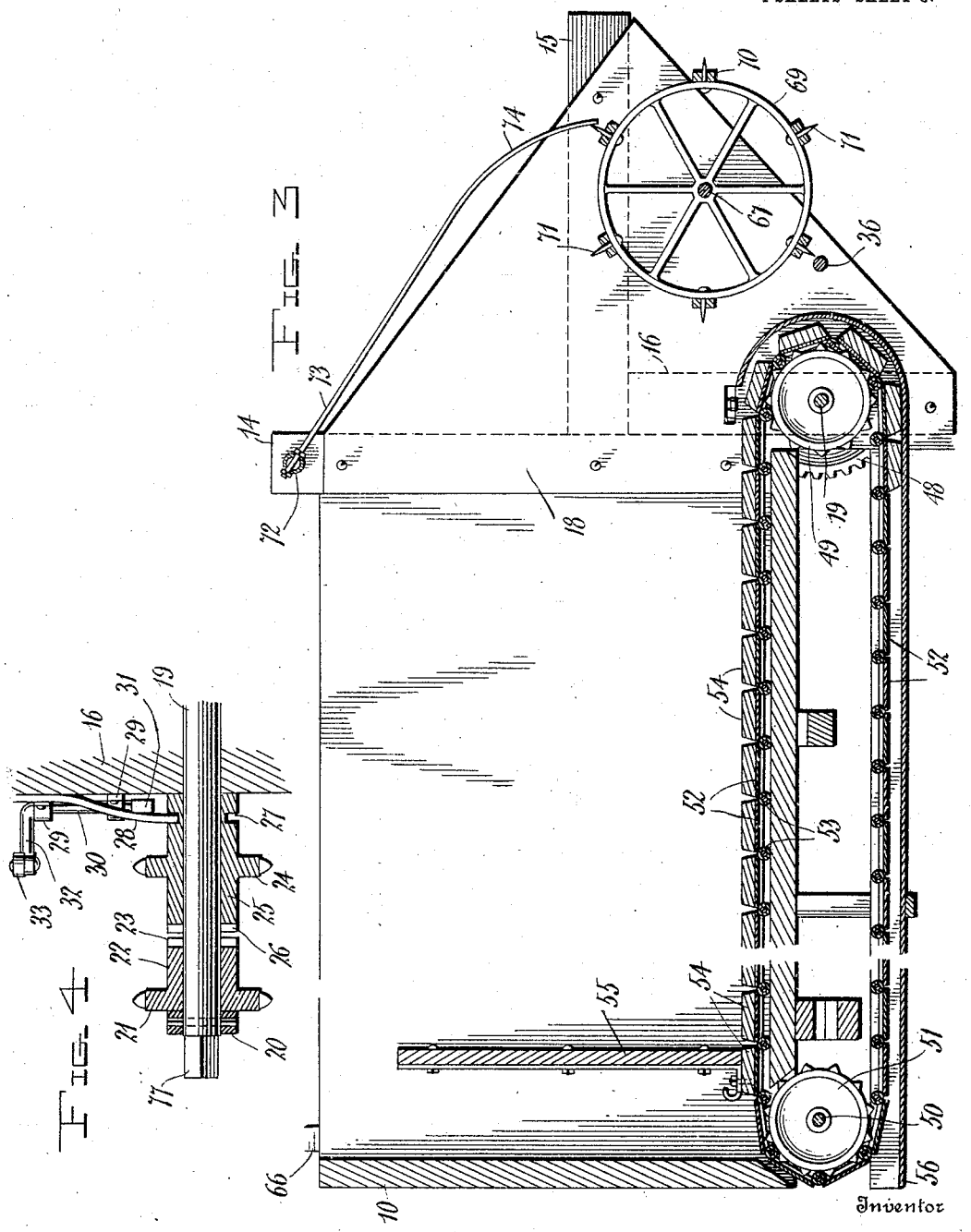

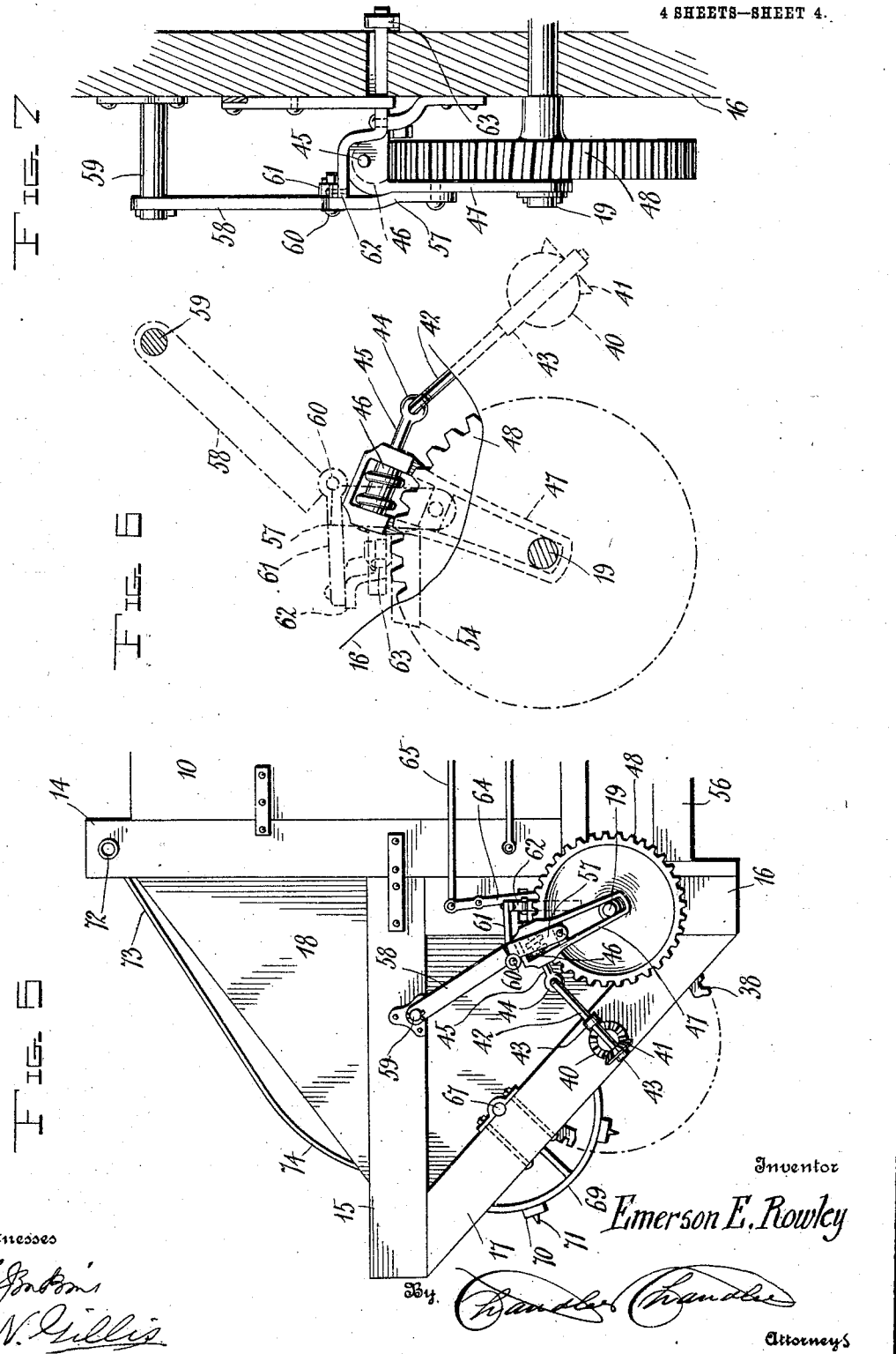

EMERSON E. ROWLEY, OF BRADSHAW, NEBRASKA.

MANURE-SPREADER.

954,137.     Specification of Letters Patent.     Patented Apr. 5, 1910.

Application filed July 26, 1909. Serial No. 509,612.

*To all whom it may concern:*

Be it known that I, EMERSON E. ROWLEY, a citizen of the United States, residing at Bradshaw, in the county of York, State of Nebraska, have invented certain new and useful Improvements in Manure-Spreaders; and I do hereby declare the following to be a full, clear, and exact description of the invention, such as will enable others skilled in the art to which it appertains to make and use the same.

This invention relates to farming implements and has special reference to a manure spreader adapted to be fitted to a farm wagon.

One object of the invention is to improve the general construction of devices of this character so that they may be readily fitted to any existing type of farm wagon.

Another object of the invention is to provide an improved mechanism for driving the shredder commonly used in implements of this character.

A third object of the invention is to provide a novel cut out mechanism arranged to stop the movement of the conveyer platform when all of the material has been distributed.

With the above and other objects in view, as will be hereinafter apparent, the invention consists in general of a wagon provided with an improved form of fertilizer distributer, the latter having improved driving, shredding and cut out mechanisms.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a plan view of a manure spreader constructed in accordance with this invention, certain of the parts being broken the better to disclose the working elements. Fig. 2 is a side elevation thereof partly broken away. Fig. 3 is a longitudinal median section therethrough, the central portion being broken out. Fig. 4 is a detail view of the clutch mechanism for starting and stopping the spreader mechanism. Fig. 5 is an enlarged detail view of the right rear end of the machine. Fig. 6 is an enlarged detail view of a portion of the mechanism shown in Fig. 5, the view being taken from inside. Fig. 7 is an end elevation of the mechanism illustrated in Fig. 6.

The numeral 10 indicates the body of an ordinary farm wagon and this body is provided with the usual front wheels 11 and rear wheels 12. One of the rear wheels 12 has attached thereto a sprocket wheel 13. This sprocket wheel 13 constitutes the main drive wheel and is fixed to its wheel 12 so that when the wagon is drawn forward the sprocket 13 is caused to revolve. Attached to the rear end of the wagon are corner posts 14 to each of which is attached a triangular frame comprising a horizontal member 15, a vertical member 16 and a brace 17. To these frames are attached sheets of steel or the like as indicated at 18 to prevent the material escaping over and between said frames as it is delivered to the rear end of the cart.

Supported in the members 16 is a shaft 19 upon one end of which is secured a collar 20. Immediately adjacent the collar and freely revoluble on the shaft is a sprocket 21 provided with a hub 22 having clutch teeth 23 on its inner face. Also mounted on the shaft 19 and freely revoluble thereon is a second sprocket 24 provided with an elongated hub 25 upon one end of which are formed clutch teeth 26 adapted to engage the clutch teeth 23. This hub 25 is further provided with a peripheral groove 27 wherein lie the forked ends of a resilient shipper bar 28.

Mounted in suitable bearings 29 on the side of the wagon is a rock shaft 30 provided with an arm 31 which extends behind the shipper bar 29. This arm 31 is preferably at the lower end of the rock shaft 30 and this rock shaft has its upper end provided with an arm 32 and to which is connected a link 33 which extends forward along the wagon to a lever 34. By means of this arrangement when the lever is pulled the clutch teeth 26 are thrown into engagement with the clutch teeth 23 so that if one of these sprockets be revolved the other likewise will revolve. In order to revolve these sprockets the sprocket 24 is connected to the sprocket 13 by means of a chain 35.

Mounted in the members 17 is a shaft 36 upon one end of which is mounted a large sprocket 37 which has formed thereon an offset gear 38. A chain 39 connects the sprocket 37 with the sprocket 21 so that when the latter is revolved the sprocket 37 will revolve. This sprocket is securely keyed to the shaft 36, and in consequence, when the sprocket is revolved the shaft 36 will also revolve. On the other side of the wagon the shaft 36 carries a bevel gear 40 which meshes with a similar bevel gear 41 carried on a shaft 42 supported in bearings 43 on the member 17. This shaft 42 is connected by a universal joint 44 to a short shaft 45 whereon is mounted a worm 46. This worm is held in suitable bearings which are arranged to move laterally by means of a guide arm 47 mounted on the shaft 19. Fixed upon the shaft 19 is a worm gear 48 with which the worm 46 normally meshes. Now, when the vehicle is in motion and the clutch thrown in, the gear 40 will transmit motion to the gear 41. This in turn will cause the worm to rotate and as the worm rotates the worm wheel 48 will be actuated, thereby rotating the shaft 19. Upon the shaft 19 is mounted a pair of sprockets 49. Adjacent the forward end of the wagon is a shaft 50 whereon are mounted sprockets 51, and over the sprockets 49 and 51 extend chains each, comprising links 52 connected by means of suitable cross bars or pins, and on each of these pins is mounted a roller 43 so arranged that one side thereof projects below the link when the latter rests on the floor or board of the wagon. Extending from one of these chains to the other are conveyer slats 54 each of which is securely connected to one of the links at each end. Now, as the shaft 19 is rotated the sprockets 49 will be rotated and will cause the sprocket chains together with the slats 54 to be carried forward. These conveyer chains have slats thereon only throughout a portion of their length, and the forward slat 54 has extended upward therefrom a follower board 55 to a slat whereon it is carried. Extending around the rear end of the conveyer and securely supported beneath the wagon body is a casing 56 wherein said chains and slats run when the follower board 55 is drawn to the rear.

In order to prevent the follower board from being forced too far to the rear, the yoke 47 is made slidable on the shaft 19 and connected to this yoke is an arm 57 which is pivotally connected to an arm 58 having a fixed pivot 59. By means of this construction there is formed a species of knuckle joint lever, the two members 57 and 58 being pivoted together as at 60. Connected to this pivot 60 is a link 61, the opposite end whereof is connected to a bent lever 62 one end of which extends through bar 16 and into the path of the upper leg of the conveyer platform and is adapted to be engaged by a hook 63 projecting therefrom. This hook 63 is located on the end slat of the conveyer and when this end slat reaches its farthest point rearward the hook engages this end and moves the lever which pulls upon the link 61 and breaks the knuckle joint as shown in dotted lines in Fig. 6. This lifts the worm 46 and frees it from the worm gear 48 so that the motion of the conveyer apron ceases. In order that this operation may be accomplished by hand there is also provided a lever 64 pivoted intermediate its ends to the members 16, and this lever has its upper end connected by means of a reach rod 65 to an operating lever 66 on the forward end of the wagon. When the lever 66 is moved in one direction it breaks the knuckle joint in the same manner that the hook 63 does and produces precisely the same action. When the lever 66 is moved in the other direction it straightens the knuckle joint and holds the worm 46 down on the gear 48 until the conveyer has reached the limit of its movement.

In order to provide for shredding and separating the manure a shaft 67 is mounted on the members 17 and on this shaft is keyed a gear 68 which meshes with the gear 38. Between the members 17 on the shaft 67 is mounted a drum 69 provided with slats 70 from which project teeth 71. By means of this arrangement the top of the drum is caused to move rearwardly and the teeth on the slats tear up and separate the packed manure. In order to aid in this process the posts 14 support a shaft 72 provided with a series of downwardly and rearwardly extending spring teeth 73 having downwardly curved ends 74 which terminate adjacent the path of the teeth 71, and these teeth are normally held in their lowermost position not only by their inherent resiliency, but furthermore, by means of a bent lever 75 having a spring 76 connected at one end thereto and at the free end to one of the members 14.

In order to actuate the conveyer by hand one end of the shaft 19 is square as indicated at 77 and this squared portion is adapted to receive a removable crank handle 78.

In the operation of the device, the cart is loaded and driven to the field which it is desired to fertilize. The clutch gear 24 is then moved over by means of the lever 34 into engagement with the sprocket 21. The cart is then driven to and fro across the field and as it moves along, the various gears rotate by means of the belts and worm drive. As this is going on the upper side of the conveyer moves slowly to the rear while at the same time the shredder is rapidly turned. Fertilizer is thus constantly but slowly fed to the shredder and is there torn to pieces and delivered on the ground, the spring fingers 73 assisting in keeping the supply uniform by forcing back any lumps which have not been disintegrated. The device thus insures an even distribution of the material so long as any fertilizer remains in the cart. When the follower board has reached its rearmost position the shaft 19 is automatically thrown out of gear in the manner previously described and the operation of delivery ceases. The crank handle may then be fitted on this shaft and rotated until the follower board is again in its position at the forward end of the wagon body and the filling of the wagon may be repeated from a suitable source of supply.

There has thus been provided a highly efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a device of the kind described, a wagon body, a conveyer movable therein, gearing to operate said conveyer including a shaft section mounted in fixed bearings, a second shaft section universally jointed to the first section, a bearing for said second section, a sliding and swinging arm supporting said bearing, a knuckle joint link supporting said arm, a worm on said second section, a worm wheel adapted for actuation by the worm, a lever pivoted intermediate its ends and projecting over said conveyer, a link connecting one end of said lever with the joint of the knuckle joint link, and a hook on said conveyer engageable with the opposite end of said lever to "break" the link and draw the worm out of gear with the worm wheel.

2. In a device of the kind described, a wagon body, a conveyer movable therein, gearing to operate said conveyer including a shaft section mounted in fixed bearings, a second shaft section universally jointed to the first section, a bearing for said second section, a sliding and swinging arm supporting said bearing, a knuckle joint link supporting said arm, a worm on said second section, a worm wheel adapted for actuation by the worm, a lever pivoted intermediate its ends and projecting over said conveyer, a link connecting one end of said lever with the joint of the knuckle joint link, and a hook on said conveyer engageable with the opposite end of said lever to "break" the link and draw the worm out of gear with the worm wheel; and manually operable means adapted to actuate said lever at will.

3. In a device of the kind described, a wagon body, a conveyer movable therein, gearing to operate said conveyer including a shaft section mounted in fixed bearings, a second shaft section universally jointed to the first section, a bearing for said second section, a sliding and swinging arm supporting said bearing, a knuckle joint link supporting said arm, a worm on said second section, a worm wheel adapted for actuation by the worm, a lever pivoted intermediate its ends and projecting over said conveyer, a link connecting one end of said lever with the joint of the knuckle joint link, and a hook on said conveyer engageable with the opposite end of said lever to "break" the link and draw the worm out of gear with the worm wheel; and manually operable means adapted to actuate said lever at will, said means comprising a lever pivoted on said wagon body and having one end engaged with the first mentioned lever, a lever at the opposite end of said wagon body, and a reach rod connecting said levers.

4. In a device of the kind described, a wagon body, a conveyer movable therein, gearing to operate said conveyer including a shaft section mounted in fixed bearings, a second shaft section universally jointed to the first section, a drive shaft for said conveyer extending transverse the body, an arm having a longitudinal slot therein engaged over said drive shaft whereby the drive shaft supports the arm for sliding and swinging movement, bearings in said arm for the second shaft section, a gear on said drive shaft, a worm on said second shaft section engageable with the gear, said worm being held in the slot of said arm, a link pivoted to said arm, a second link having one end pivoted to the body and the other to the end of the first mentioned link, said first and second links forming a knuckle joint, a lever pivoted intermediate its ends and projecting over the conveyer, a link connecting one end of said lever with the joint of the knuckle joint link, a hook on said conveyer engageable with the opposite end of said lever to "break" the link, lift the slotted arm and draw the worm out of gear with the gear on the drive shaft, and manually operable means to actuate said lever at will.

In testimony whereof, I affix my signature, in presence of two witnesses.

EMERSON E. ROWLEY.

Witnesses:
L. D. ROWLEY,
JAMES B. CARLISLE.